United States Patent [19]

Ito

[11] Patent Number: 5,124,690
[45] Date of Patent: Jun. 23, 1992

[54] INFORMATION DISPLAY DEVICE
[75] Inventor: Masazumi Ito, Toyohashi, Japan
[73] Assignee: Minolta Camera Kabushiki Kaisha, Osaka, Japan
[21] Appl. No.: 664,609
[22] Filed: Mar. 4, 1991
[30] Foreign Application Priority Data Mar. 5, 1990 [JP] Japan .................................. 2-53055

[51] Int. Cl.⁵ .......................................... G09G 3/02
[52] U.S. Cl. ................................... 340/715; 355/208; 355/209
[58] Field of Search ............... 355/209, 206, 204, 203, 355/208, 205, 207; 340/286.13, 679, 713, 750, 715

[56] References Cited

U.S. PATENT DOCUMENTS

| | | | |
|---|---|---|---|
| 4,327,994 | 5/1982 | Barley et al. | 355/14 |
| 4,398,819 | 8/1983 | Schron | 355/14 |
| 4,475,806 | 10/1984 | Daughton et al. | 355/209 |
| 4,572,652 | 2/1986 | Tada et al. | 355/206 |
| 4,609,919 | 9/1986 | Miyazaki et al. | 355/206 X |
| 4,617,661 | 10/1986 | Futaki et al. | 355/208 X |
| 4,910,553 | 3/1990 | Suzuki | 355/203 |
| 4,922,295 | 5/1990 | Takano et al. | 355/209 |

FOREIGN PATENT DOCUMENTS

62-200418 9/1987 Japan .

Primary Examiner—R. L. Moses
Assistant Examiner—Sandra L. Brasé
Attorney, Agent, or Firm—Burns, Doane, Swecker & Mathis

[57] ABSTRACT

An information display device for displaying information regarding an apparatus in which the information display device is employed, the information display device comprising an inputting unit for inputting a message in accordance with the status of the apparatus; a storing unit for storing the inputted message data; a control unit for reading out the message data stored in the storing unit in accordance with the status of the apparatus; and a displaying unit for displaying the message data.

20 Claims, 12 Drawing Sheets

INFORMATION DISPLAY DEVICE

BACKGROUND OF THE INVENTION

1) Field of the Invention

The present invention relates to an information display device for displaying information regarding an apparatus such as a copier employing the above information display device.

2) Description of the Related Art

An information display device for displaying information regarding an apparatus is employed, for example, in a copier. More specifically, the information display device displays information such as out-of-paper, out-of-toner, paper jamming and warm-up state by using predetermined messages, patterns or LED lamps.

There has been proposed in Japanese Patent Publication Kokai No. 62-200418 an information display device wherein messages are displayed sequentially or a long message is displayed, if necessary, to instruct an operator an operation method of the apparatus or how to manage a trouble in response to the input from a predetermined key (help-key).

In this type of device, messages to be displayed are set when the apparatus is manufactured. For example, when the apparatus is out of papers, a message "PAPER EMPTY" is displayed and when the apparatus is out of toner, a message "TONER EMPTY" or "*" is displayed.

Such messages should not be too short or too long for easy understanding and proper length of the messages depends on an operator's skill with the apparatus (for example, whether or not the operator can manage alone when the apparatus has some trouble), installation environment and working condition of the apparatus. Therefore, it is ideal that messages like "A4 SIZE PAPERS AVAILABLE AT THE SECOND FLOOR RECEPTION" and "TONER IS IN THE FIRST WAREHOUSE" are displayed in accordance with the operator's convenience or skill.

However, in a conventional information display device, lengths of messages to be displayed are determined supposing that an operator of average skillness operates the apparatus under normal condition, since such messages are set at the time of manufacturing, as described above. Therefore, it has been difficult to display various messages for individual users.

SUMMARY OF THE INVENTION

An object of the present invention, therefore, is to provide an information display device capable of displaying proper messages for individual users regardless of installation environment and working condition of an apparatus in which the information display device is employed and of an operator's skill.

The above object is fulfilled by an information display device for displaying a message in accordance with the status of an apparatus in which the above information display device is employed, the information display device comprising a changing unit for changing a message to be displayed; an inputting unit for inputting instructions to change the message to be displayed; and a displaying unit for displaying the changed message.

The above object is also fulfilled by an information display device for displaying information regarding an apparatus in which the information display device is employed, the information display device comprising an inputting unit for inputting a message in accordance with the status of the apparatus; a storing unit for storing the inputted message data; a control unit for reading out the message data stored in the storing unit in accordance with the status of the apparatus; and a displaying unit for displaying the message data.

The above object is also fulfilled by a display device, for use in an image forming apparatus, for displaying information regarding the status of the image forming apparatus comprising a storing unit for storing an information regarding the status of the image forming apparatus; a displaying unit for displaying the message stored in the storing unit; and a writing unit for writing an information to modify the displayed information by the displaying unit.

The above object is also fulfilled by a display device, for use in an image forming apparatus, for displaying information regarding the status of the image forming apparatus comprising a writing unit for writing a message; a storing unit for storing the written message in a predetermined area of a menu, the storing unit having the menu; a displaying unit for displaying the stored message; and a control unit for controlling the storing unit and the displaying unit so as to automatically call the message stored in the predetermined area in accordance with the status of the image forming apparatus and to display the called message in the displaying unit.

According to the above construction, a user can optionally modify messages to be displayed. Therefore, messages can be displayed in accordance with installation environment of the apparatus and lengths of the messages can be changed in accordance with the operator's skill. More specifically, if the operator inputs, designating a menu, a message "OPEN THE FRONT DOOR AND PUSH THE LEFT-HAND YELLOW SWITCH." by inputting means, the message is stored in association with the designated menu, for example, "ABNORMAL TEMPERATURE RISE IN FIXING SECTION"

Thereafter, when information regarding the abnormal temperature rise in the fixing section is sent from the apparatus to the display device, the menu "ABNORMAL TEMPERATURE RISE IN FIXING SECTION" is selected and the message "OPEN THE FRONT DOOR AND PUSH THE LEFT-HAND YELLOW SWITCH." corresponding to the above menu is read out and displayed.

Another object of the present invention is to provide an information display device capable of easily modifying messages.

In the above construction, the inputting unit may be a key switch provided on an operation panel.

The inputting unit may also be an interface for receiving data from a recording medium.

The inputting unit may also be an interface for receiving data from a message modification data output apparatus on line.

According to the above construction, the messages can easily be modified by operating the key switches on the operation panel or by using a word processing function or an edit function of a personal computer.

Still another object of the present invention is to provide an information display device capable of easily restoring modified messages to original messages, if necessary.

The above object is fulfilled by a display device, for use in an image forming apparatus, for displaying information regarding the status of the image forming apparatus comprising an outputting unit for outputting a status signal corresponding to the status of the image forming apparatus; a first storing unit for storing a plurality of original messages regarding the status of the image forming apparatus; a second storing unit for storing the plurality of original messages transferred thereto from the first storing unit; a displaying unit for automatically displaying a predetermined message out of the plurality of messages stored in the second storing unit in response to the status signal output by the outputting unit; a sending unit for sending one of the plurality of messages from the second storing unit to the displaying unit regardless of the status signal; and a modifying unit for modifying the message displayed by the displaying unit; and an inputting unit for inputting the modified message into the second storing unit.

According to the above construction, since the original messages are stored in the first storing means, the modified messages can easily be restored to the original messages.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

DESCRIPTION OF THE PREFERRED EMBODIMENT

An embodiment of the present invention will be described hereinafter, referring to the drawings. In this embodiment, an information display device according to the present invention is employed in a copier.

Construction of the copier

Figure 1:
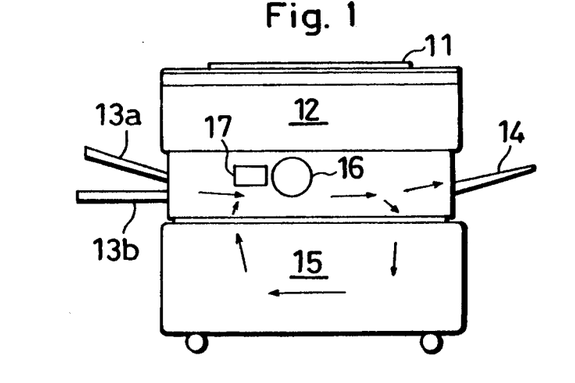
FIG. 1 is a schematic view showing a construction of a copier in which an information display device according to the present invention is employed.

FIG. 1 is a schematic view showing a construction of the copier. This copier is of electrophotographic type. As shown in FIG. 1, an original document mounted on a document table 11 is scanned by a scanning optical system 12, whereby an electrostatic image is formed on a photoconductive drum 16 by a reflected light from the original document. Then, the electrostatic image is developed by a developing device 17 to form a toner image and the toner image is transferred onto a recording paper which is fed from a paper cassette 13a or 13b or a two-side unit 15 along a transport path indicated by arrows in the drawing. The transferred image is fixed by a fixing device and then, the recording paper is delivered onto a paper tray 14.

In the above construction, the two-side unit 15 is for use in a two sided copy mode.

In the two sided copy mode, the toner image is transferred onto a first side of a recording paper fed from the paper cassette 13a or 13b and the transferred image is fixed. Then, the recording paper having the image on the first side thereof is transported to the two-side unit 15 to be accommodated in a central tray in the unit 15. Thereafter, the recording paper is fed again in such a manner that an image is transferred onto a second side thereof, that is, a reverse side of the first side. Thus, the recording paper having images on both sides thereof are delivered onto the paper tray 14.

When a plurality of two sided copies are required from the same original document, images are recorded on first sides of plural recording papers continuously and the recording papers having images on one sides are temporarily accommodated in the central tray in the unit 15. When one sided copies of a number set by an operator are completed, the recording papers are fed again and images are recorded on second sides thereof continuously.

In this copier, 50 recording papers at maximum can be accommodated in the central tray. In other words, a maximum number of two sided continuous copies is 50. Therefore, if an operator sets 51 or more number in the two sided continuous copy mode, an alarm message is displayed as will be described later.

Control signals

Figure 2:
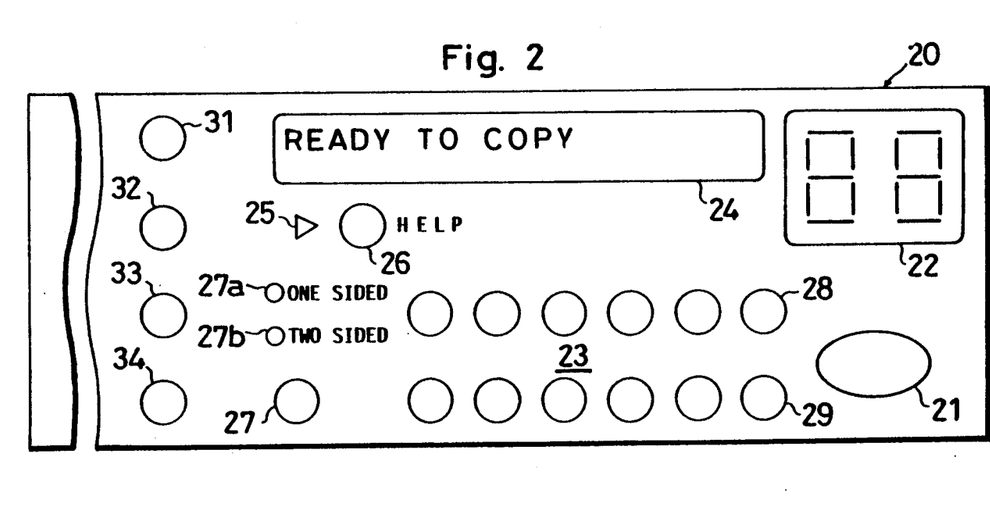
FIG. 2 is a view explaining an operation panel of the above copier.
Figure 3:
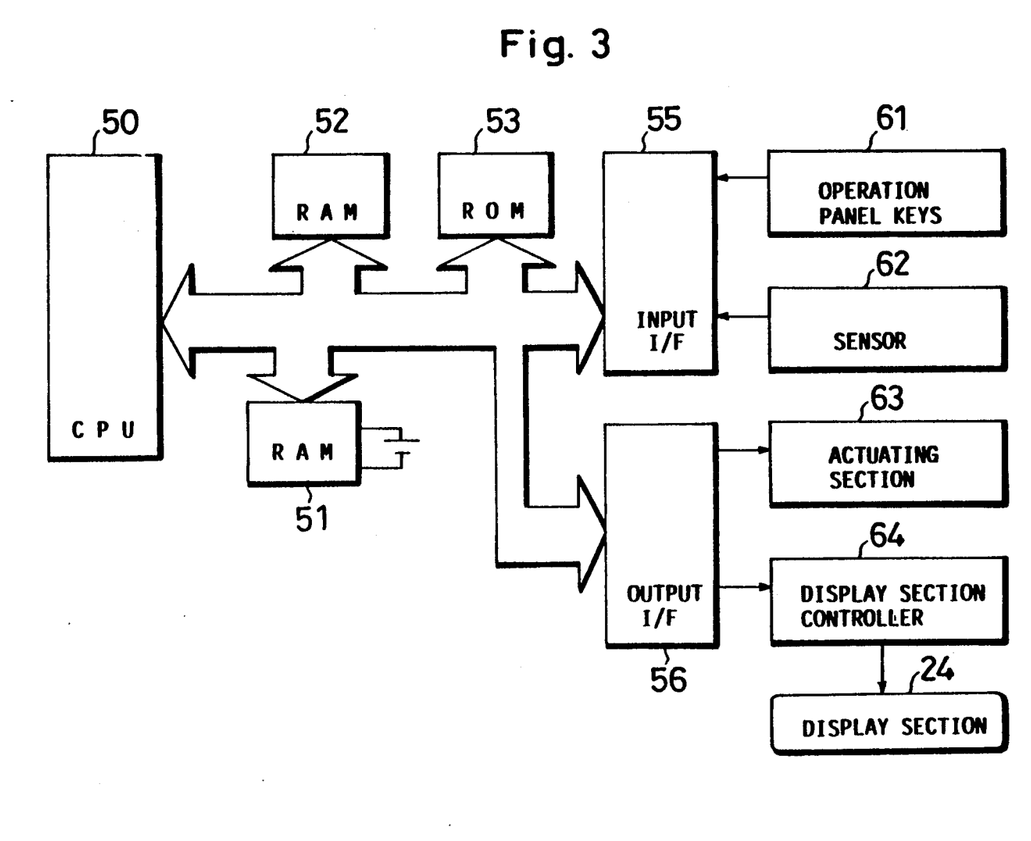
FIG. 3 is a block diagram showing a construction of a control circuit of the above copier.
Figure 4:
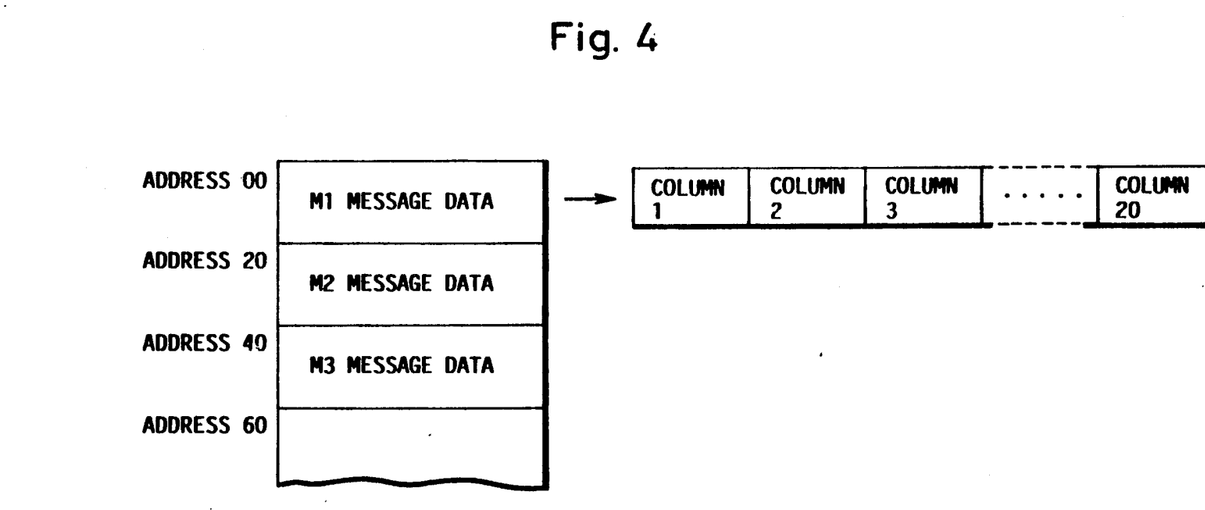
FIG. 4 is a view explaining a memory construction of a RAM 51 in FIG. 3.

FIG. 2 is a view explaining an operation panel of the above copier, FIG. 3 is a block diagram showing a construction of a control circuit of the same and FIG. 4 is a view explaining a memory construction of a RAM 51 in FIG. 3.

On an operation panel 20 are arranged key switches and display sections. The key switches and display sections include a print key 21 for starting a copying operation, ten keys 23 for inputting number 0 through 9, a clear/stop key 29 for clearing a continuous copy mode or the like and stopping a continuous copying operation, an interrupt key 28 for temporarily stopping the continuous copying operation for an interrupt copying operation, copy mode selection key 27 for selecting either of a one sided copy mode and a two sided copy mode, one sided copy display LED 27a for displaying that the one sided copy mode is being selected, two sided copy display LED 27b for displaying that the two sided copy mode is being selected, a 7-segment alphanumeric display section 22 for displaying a number of continuous copies set for the same original document and displaying other references, a help key 26 for displaying an alarm message, an alarm display LED 25 for indicating that the alarm message is displayed in response to the input of the help key 26, a display section 24 for displaying messages such as predetermined explanations in response to the input from the help key or the like, a message modification mode key 31 for selecting a message modification mode and selecting a message to be modified, a character select key 32 for selecting a character to be substituted for a blinking character displayed in the display section 24 in the message modification mode, a character column shift key 33 for sequentially blinking characters in the message to be modified column by column and an original message data restoring key 34 for restoring the message data displayed in the display section 24 to the original message data before the modification. Concerning other key switches and display sections provided on the operation panel 20, explanation is eliminated here.

In FIG. 3, signals from the above key switches are shown as an input from operation panel keys 61. That is, signals input from the operation panel keys 61 are sent to a CPU 50 through an input interface 55. To the CPU 50 are also sent through the interface 55 signals from various sensors 62 provided in the copier. The sensors 62 detect the warm-up state and the completion thereof and output signals on the basis of the detection result.

Control signals for controlling the display section 24 are sent from the CPU 50 and to a display section controller 64 through an output interface 56. The display section controller 64 controls display in the display section 24.

In addition, control signals for controlling the display LEDs 25, 27a and 27b and other actuating sections etc. are shown as a control signal to an actuating section 63.

A battery backed up RAM 51 is a memory for storing message data of messages M1–M3 which are to be displayed in the display section 24 in accordance with the status of the copier. Contents of the above three messages M1–M3 are as follows:

M1: message indicating that the copier is in a warm-up state,

M2: message indicating that the warm-up has been completed and that the copier is in a ready state, M3: message indicating that a maximum number of two sided continuous copies is 50.

FIG. 4 shows a memory construction of the RAM 51. Data corresponding to 1-20 columns are respectively stored at address 00-address 19 as data of the message M1. Similarly, data of the message M2 and message M3 are respectively stored at address 20-address 39 and address 40-address 59. The above data of the messages M1-M3 can be modified by a user in the message modification mode. The message modification mode is selected by the operation of the message modification mode key 31.

In a ROM 53 are stored a control program of the copier and original message data of the messages M1-M3 which are predetermined by a manufacturer or the like. The original messages M1-M3 are set, for example, as follows.

M1: "WAIT"

M2: "READY TO COPY"

M3: "2-SIDED COPY MAX. 50" When the original message data restoring key 34 is operated, the above original message data are sent to the RAM 51 for display. A RAM 52 is a memory used as a work area of the CPU 50.

Operation of the CPU 50

The operation of the information display device will be described below along operation of the CPU 50.

Figure 5:
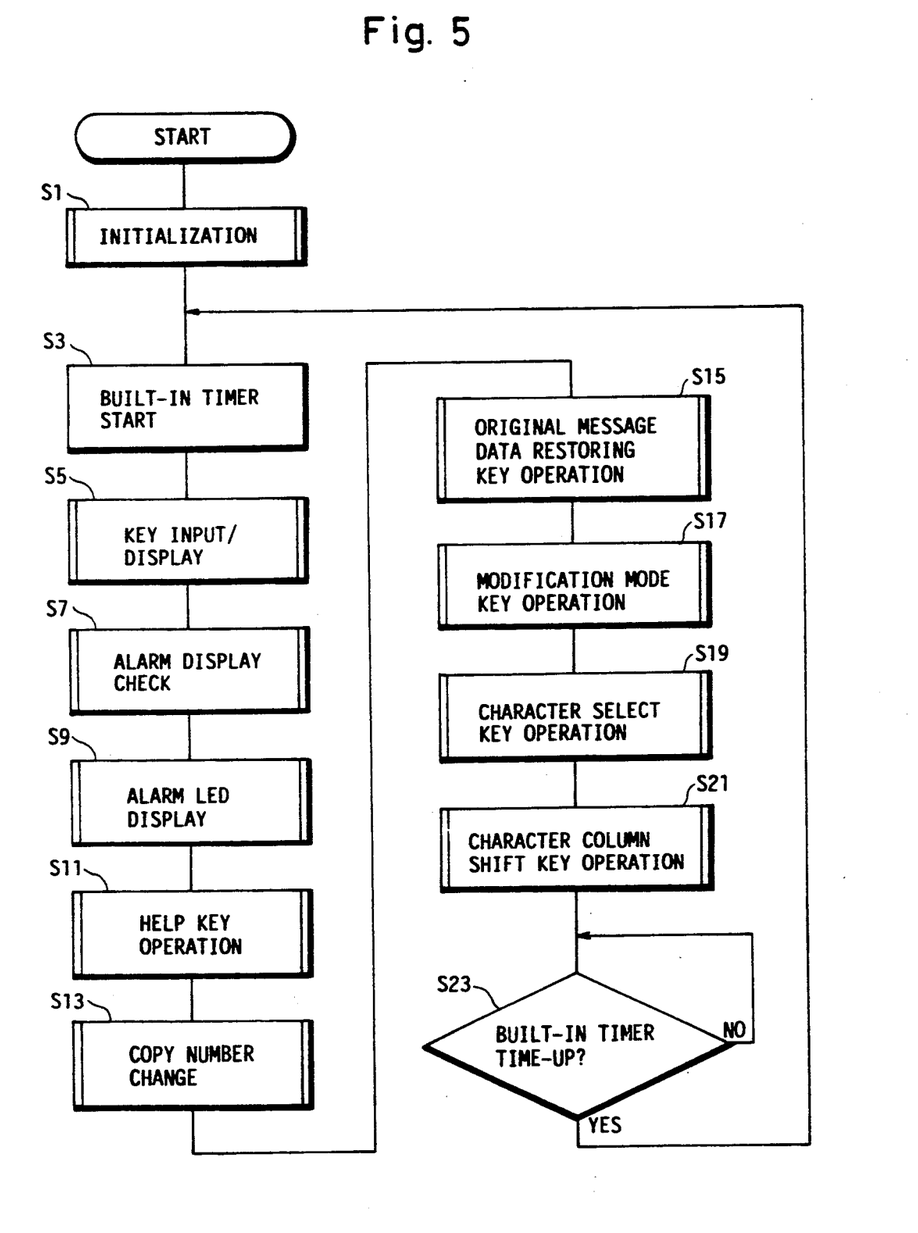
FIG. 5 is a flowchart of a main routine of a CPU 50 in FIG. 3.

1) Main routine : FIG. 5

The CPU 50 is started by turn-on of a main switch (not shown) and operations at steps S1, S3, S5, S7, S9. S11, S13, S15, S17, S19, S21 and S23 are repeated.

First, an initialization is executed at step S1. The initialization includes display in the display section 24 of the message M1 indicating that the copier is in the warm-up state, in addition to a normal initialization. Then, a built-in timer for controlling operation time of one loop is started at step S3 to synchronize the operation of the CPU 50 and an operation of another CPU etc. (not shown). Thereafter, the following subroutines are executed.

First, at step S5, detection of turn-on of each key, key input operations except message data modification, control of the display sections except the display section 24 and control of display elements are executed (referred to as key input/display). Then, at step S7, whether or not a number of two sided continuous copies set exceeds 50 is checked and a display flag of the message M3 (M3 display flag) is set or reset (alarm display check). In this subroutine, the message M1 or M2 indicating the warm-up or ready state is displayed, if necessary. Next, at step S9, the alarm display LED 25 is turned on or off in accordance with the state of the M3 display flag (alarm LED display). At step S11, the message M3 is displayed instead of the message M1 or M2 in response to the input from the help key 26 (help key operation). Then, at step S13, the number of two sided copies set is forcibly reduced to 50 in response to the input from the print key 21 (copy number change). At step S15, modified message data of the messages M1–M3 in the RAM 51 are restored to the original data stored in the ROM 53 in response to the input from the original message data restoring key 34 (original message data restoring key operation). At step S17, the message modification mode for modifying the message data is selected and a message to be modified is selected in response to the input from the message modification mode key 31 (message modification mode key operation). At step S19, each character in the message to be modified is changed to the next character in a specified order each time the character select key 32 is operated (character select key operation). At step S21, the characters in the message to be modified are blinked column by column sequentially in response to the input from the character column shift key 33 (character column shift key operation).

When time up of the built-in timer is confirmed at step S23, the program goes back to step S3 and repeats the above steps.

The above subroutines will be described in detail hereinafter.

Figure 6:
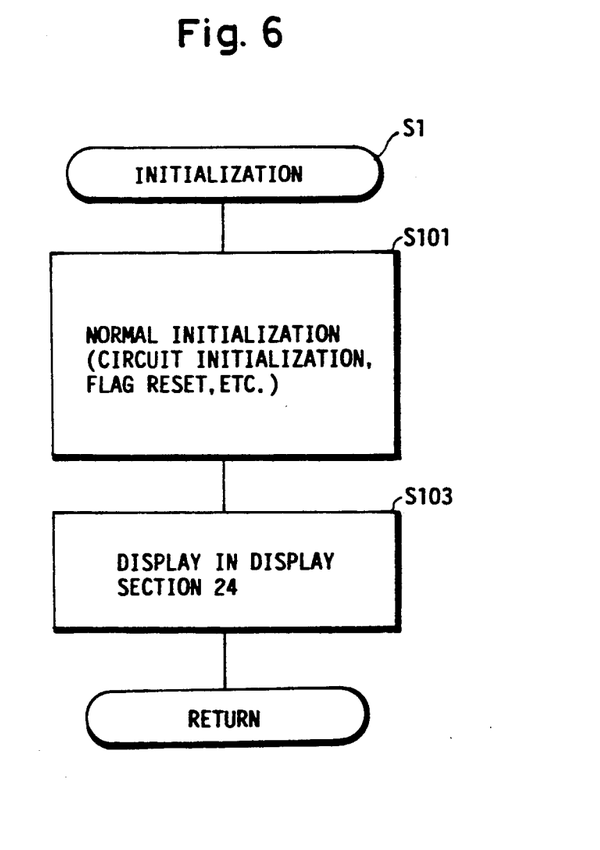
FIG. 6 is a flowchart of a initialization subroutine of the CPU 50.

2) Initialization : FIG. 6

First, circuits in the copier are initialized and flags indicating the status of the copier are reset (S101). Then, the message M1 indicating that the copier is in the warm-up state is displayed in the display section 24 (S103). The step S103 may be replaced with a warm-up state display subroutine (step S715, FIG. 8b) which will be described later.

Figure 7:
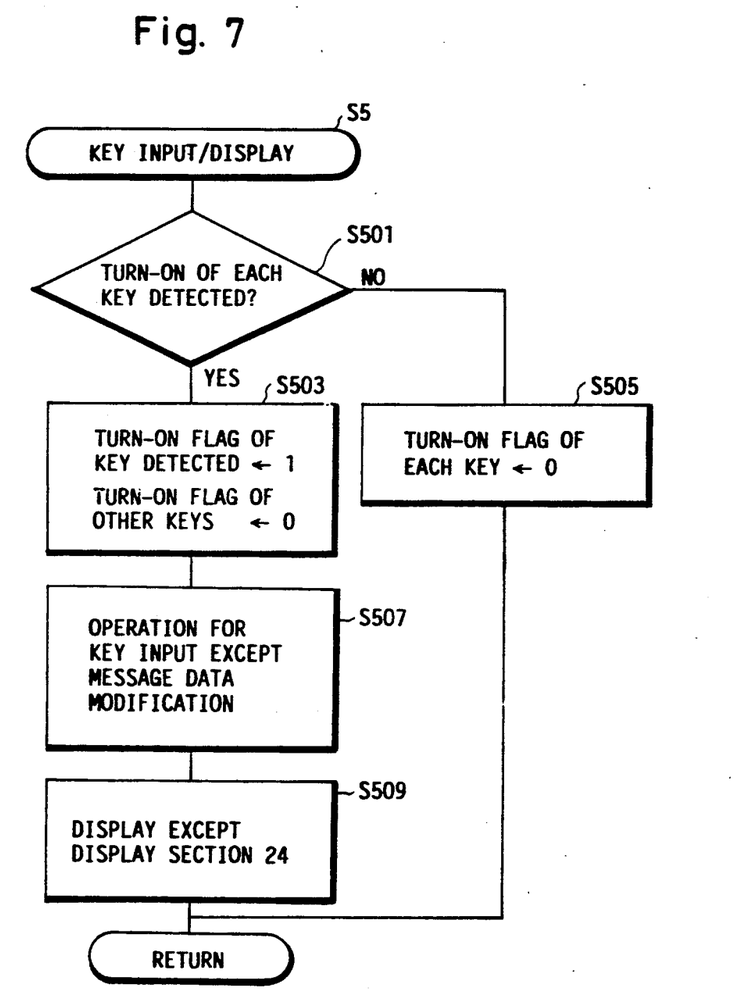
FIG. 7 is a flowchart of a key input/display subroutine of the CPU 50.

3) Key input/Display : FIG. 7

First, whether or not turn-on of each key has been detected is judged (S501). More specifically, if a key which was off during the previous key input/display subroutine is on this time, it is judged that the turn-on of that key has been detected. If turn-on is not detected, all the turn-on flags are reset (0) (S505). When turn-on of at least one key is detected, a turn-on flag corresponding to the detected key is set (1) and other turn-on flags are reset (S503). Then, operation corresponding to the turn-on flag except those for the message data modification is effected (S507). Next, display except the display in the display section 24, for example, display of a number of two sided continuous copies in the alphanumeric display section 22 is effected (S509).

Figure 8A:
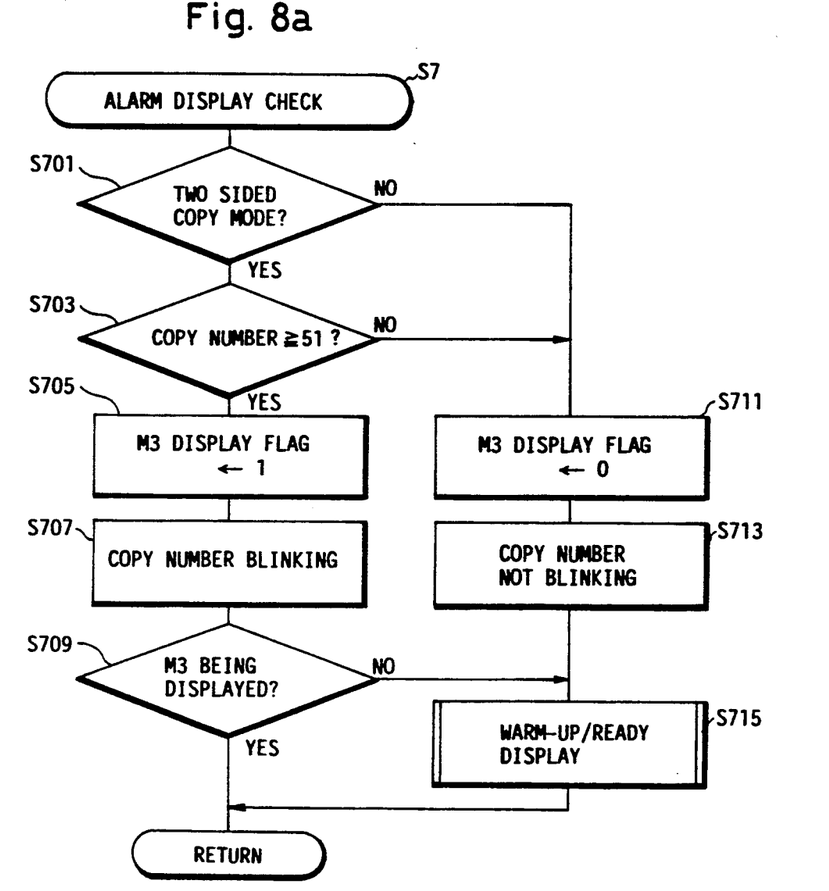
FIG. 8a is a flowchart of an alarm display check subroutine of the CPU 50.

4) Alarm display check : FIG. 8a

When a number of continuous copies for the same original document is set 51 or more (S703 ; YES) in the two sided copy mode (S701 ; YES), the M3 display flag is set (S705) and display in the alphanumeric display section 22 is blinked (S707). It is to be noted here that, in this subroutine, only whether or not the alarm message should be displayed is checked and the alarm message display is effected in the help key operation subroutine described later. Then, whether or not the message M3 is being displayed is judged (S709) and if so, the program returns to the main routine. If the message M3 is not being displayed(S709 ; NO), the program goes to step S715 at which the warm-up/ready display subroutine is executed.

On the other hand, when the two sided copy mode is not selected (S701 ; NO) or when the number of two sided copies is set 50 or less in the two sided copy mode (S703 ; NO), the M3 display flag is reset (S711) and the display in the alphanumeric display section 22 is not blinked (S713). Then, the program goes to step S715 at which the warm-up/ready display subroutine (FIG. 8b) is executed.

Figure 8B:
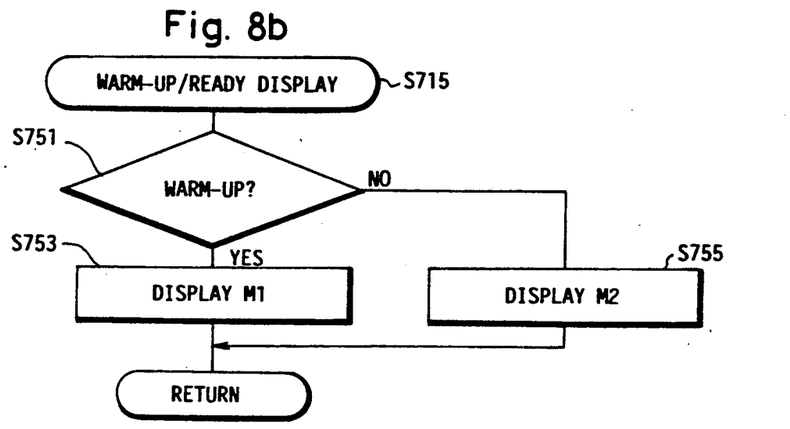
FIG. 8b is a flowchart of a warm-up/ready display subroutine of the CPU 50.

The warm-up/ready display subroutine will be described below. If the copier is in the warm-up state (S751 ; YES), the data of the message M1 are read out of the RAM 51 from the address 00 sequentially and the message M1 is displayed in the display section 24 (S753). If the copier is not in the warm-up state (S751 ; NO), the data of the message M2 are read out of the RAM 51 from the address 20 sequentially and the message M2 is displayed in the display section 24 (S755).

Figure 9:
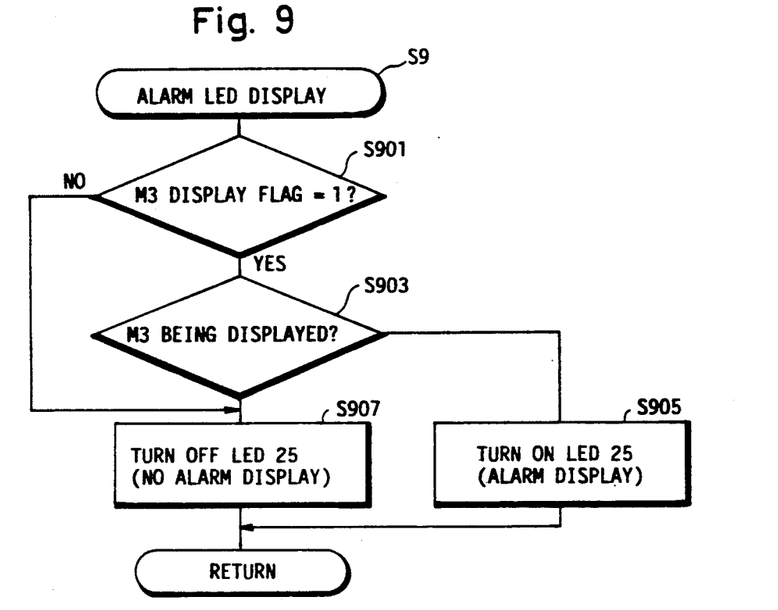
FIG. 9 is a flowchart of an alarm LED display subroutine of the CPU 50.

5) Alarm LED display : FIG. 9

When the M3 display flag is being set (S901 ; YES, refer to FIG. 8a, S705) and the message M3 is not being displayed (S903 NO), the alarm LED 25 is turned on (S905) to advise an operator to operate the help key 26.

On the other hand, when the M3 display flag is being reset (S901 ; NO) or when the M3 display flag is being set and the message M3 is being displayed (S903 YES), the alarm LED 25 is turned off (S907) since the input from the help key 26 is not necessary.

Figure 10:
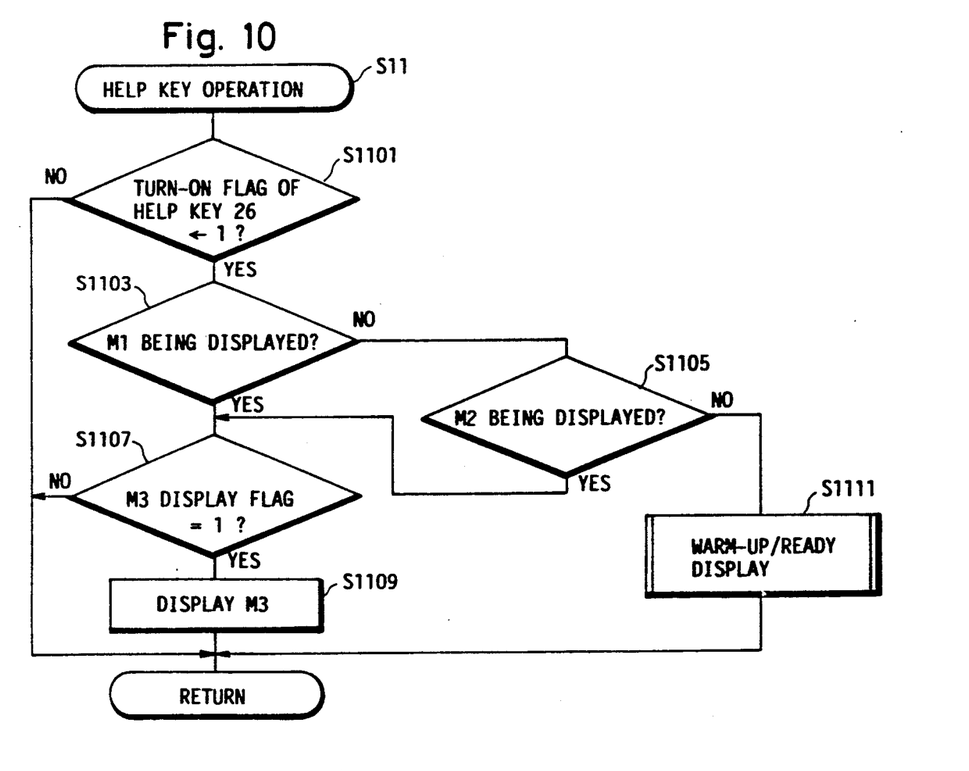
FIG. 10 is a flowchart of a help-key operation subroutine of the CPU 50.

6) Help key operation : FIG. 10

When the turn-on flag of the help key 26 is set (S1101 ; YES, refer to, FIG. 7, S503), whether or not the message M1 is being displayed in the display section 24 is judged at step S1103 and whether or not the message M2 is being displayed in the display section 24 is judged at step S1105. If the message M1 or M2 is being displayed (S1103 ; YES, S1105 ; YES), whether or not the M3 display flag is being set is judged at step S1107. If so (S1107 ; YES, refer to FIG. 8a, S705), the data of the message M3 are read out of the RAM 51 from the address 40 sequentially and the message M3 is displayed in the display section 24 (S1109).

When neither the messages M1 nor M2 is being displayed (S1103 ; NO and S1105 ; NO), the program goes to step S1111 at which the message M1 or M2 is displayed instead of the message M3 which is being displayed. That is, each time the help key 26 is operated, the message M3 and the message M1 or M2 are changed over.

Figure 11:
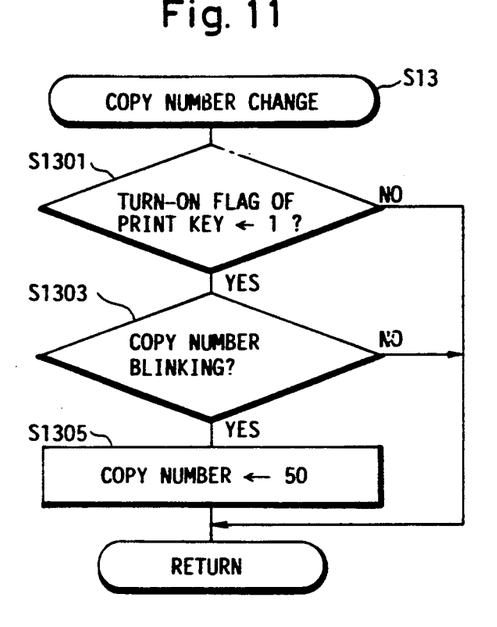
FIG. 11 is a flowchart of a copy number change subroutine of the CPU 50.

7) Copy number change : FIG. 11

When the turn-on flag of the print key 21 is set 1 (S1301 YES) and the copy number in the alphanumeric display section 22 is blinking (S1303 ; YES, refer to FIG. 8a, S707), the number of copies set is reduced to the possible maximum number of 50 (S1305). A printing operation is executed in response to the input from the print key 21 by means of another control section (not shown) using the above number of copies.

Figure 12:
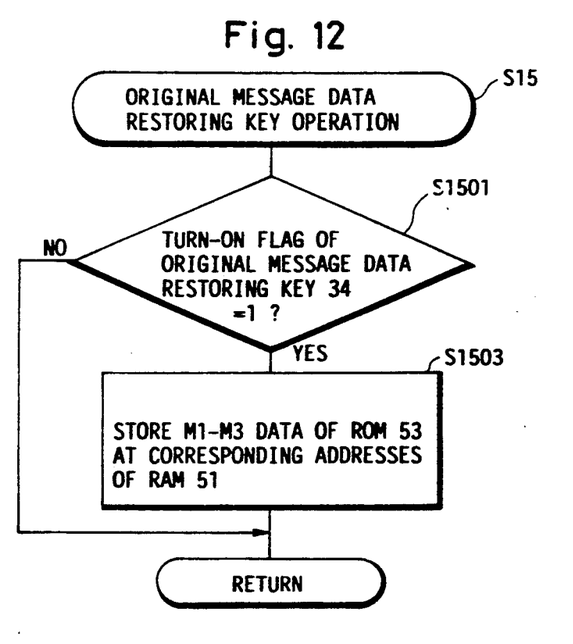
FIG. 12 is a flowchart of an original message data restoring key operation subroutine of the CPU 50.

8) Original message data restoring key operation : FIG. 12

The user made messages M1-M3 are restored to the original messages. When the turn-on flag of the original message data restoring key 34 is set (S1501 ; YES), the original messages M1-M3 stored in the ROM 53 are read out and respectively stored in memory areas for the messages M1-M3 in the RAM 51 (S1503).

Figure 13:
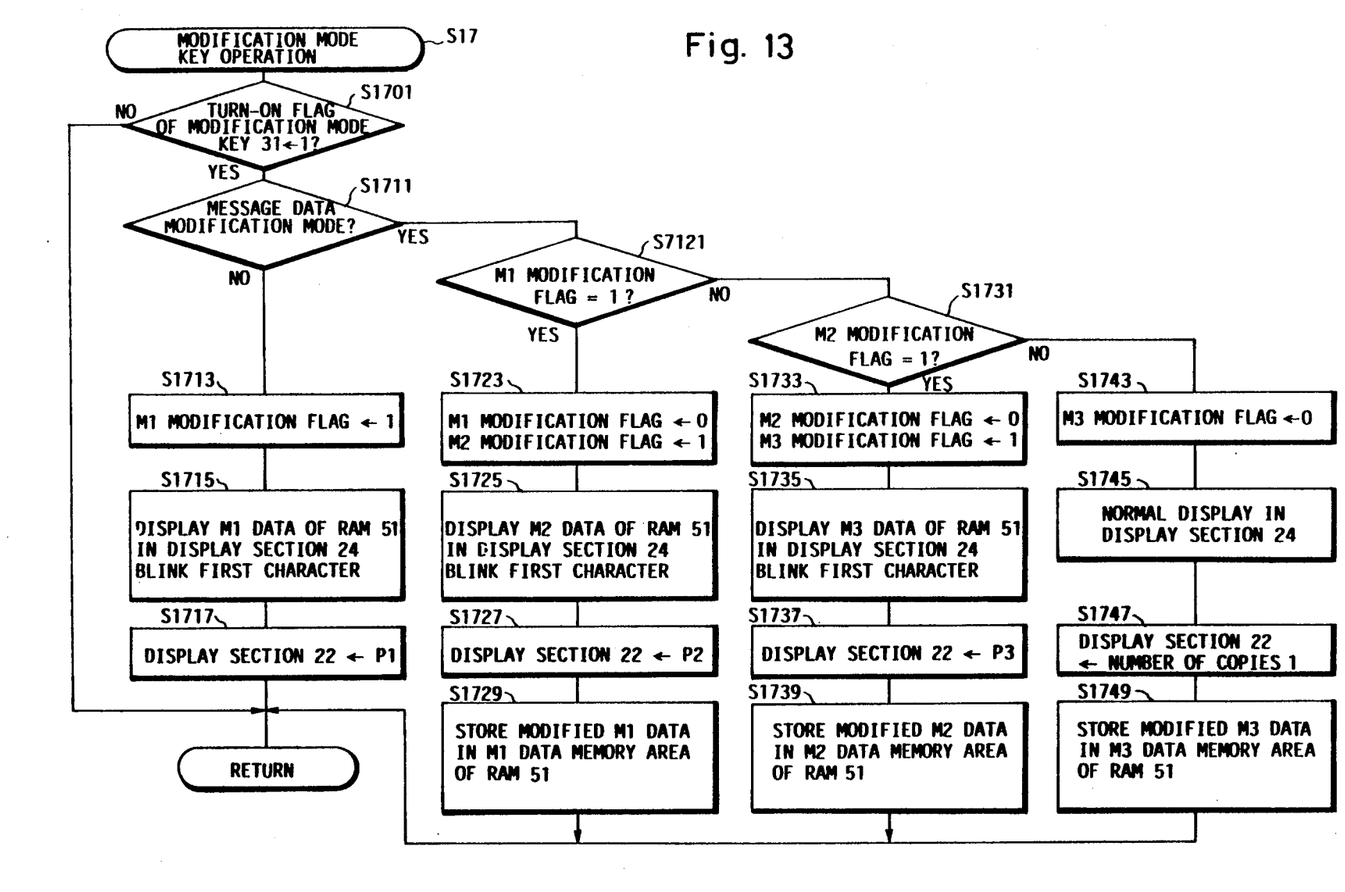
FIG. 13 is a flowchart of a modification mode key operation subroutine of the CPU 50.

9) Message modification mode key operation : FIG. 13

When the turn-on flag of the message modification mode key 31 is set (S1701 ; YES), the following operations are effected in accordance with whether or not the copier is in the message modification mode and with set/reset of M1–M3 modification flags.

a) When the copier is not in the message modification mode (when none of the messages M1–M3 are being modified in the display section 24 and the copier is in the normal mode) (S1711 ; NO), the M1 modification flag is set (S1713). Thus, the copier is put into a mode for modifying the message M1. The message data modification will be described later.

Then, the message M1 is displayed in the display section 24 on the basis of the data transmitted to the RAM 52 from the M1 memory area in the RAM 51. Then, the first character (character in the first column) in the message M1 is blinked (S1715). Further, "P1" is displayed in the alphanumeric display section 22 in order to indicate that the message M1 is being modified (S1717).

b) When the copier is in the message modification mode at step S1711, whether or not the M1 modification flag is being set is judged (S1721). If so, the M1 modification flag is reset and the M2 modification flag is set (S1723). Thus, the copier is put into a mode for modifying the message M2.

Then, the message M2 is displayed in the display section 24 in the same way as above and the first character in the message M2 is blinked (S1725). Further, "P2" is displayed in the alphanumeric display section 22 in order to indicate that the message M2 is being modified (S1727).

Thereafter, the modified data of the message M1 is read out of the RAM 52 and stored in the M1 memory area in the RAM 51 (S1729).

c) When the M1 modification flag is not being set at step S1721, whether or not the M2 modification flag is being set is judged(S1731). If so, the M2 modification flag is reset and the M3 modification flag is set (S1733). Thus, the copier is put into a mode for modifying the message M3.

Then, the message M3 is displayed in the display section 24 in the same way as above and the first character in the message M3 is blinked (S1735). Further, "P3" is displayed in the alphanumeric display section 22 in order to indicate that the message M3 is being modified (S1727).

Thereafter, the modified data of the message M2 is stored in the M2 memory area in the RAM 51 (S1739).

d) When the M2 modification flag is not being set at step S1731, that is, when the M3 modification flag is being set, the program goes to step S1743 at which the M3 modification flag is reset. Thus, the copier is put into the normal mode. Then, any of the messages M1–M3 is displayed in the display section 24 under the normal condition wherein no character is blinked (S1745). In step S1745, which of the messages M1–M3 is to be displayed may be determined depending on the warm-up state and the state of the M3 display flag, or may be determined at random. In the latter case, a proper message is selected at step S7 or S11 in the next loop. In addition, "1" is displayed in the alphanumeric display section 22 as a standard copy number (S1747) and the modified data of the message M3 is stored in the M3 memory area in the RAM 51 (S1749).

Figure 14:
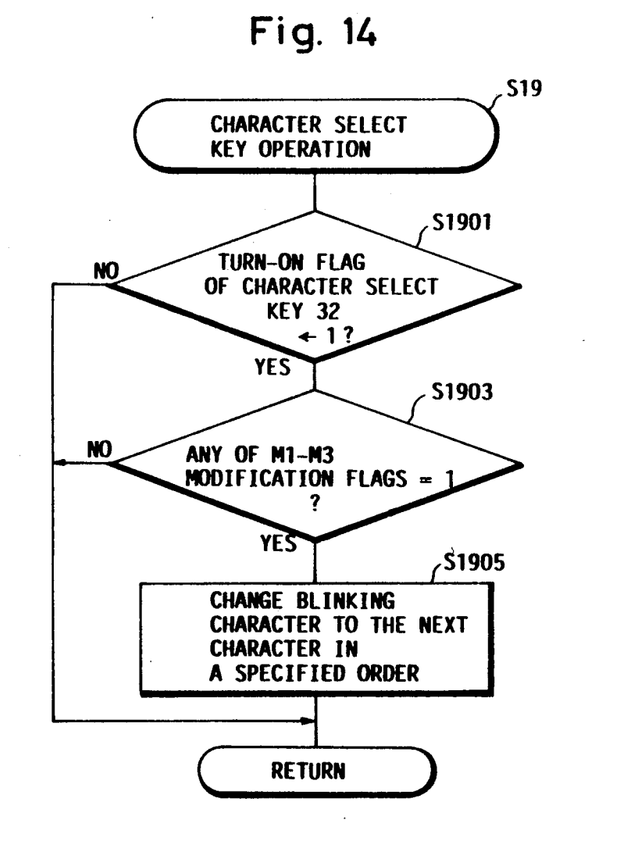
FIG. 14 is a flowchart of a character select key operation subroutine of the CPU 50.

10) Character select key operation : FIG. 14

Figure 16A:
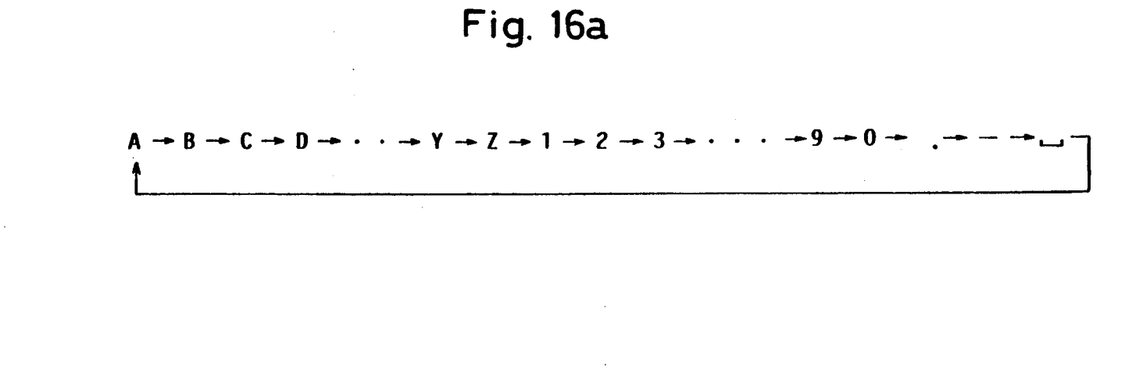
FIG. 16 is a view explaining the character select key operation and FIG. 17 is a view explaining the character column shift key operation.
Figure 16B:
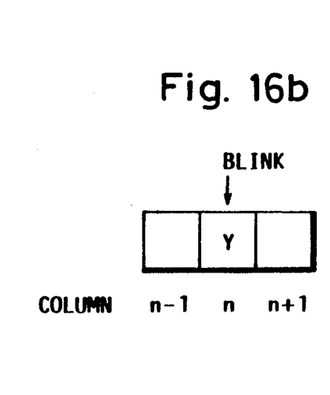

When the turn-on flag of the character select key 32 is set (S1901 YES) and any of the M1–M3 modification flags is being set (S1903 ; YES), a character blinking in the displayed message is changed to the next character in the specified order shown in FIG. 16a (S1905). For example, as shown in FIG. 16b, when a n-TH character "Y" is blinking, the character is changed to "Z".

Figure 15:
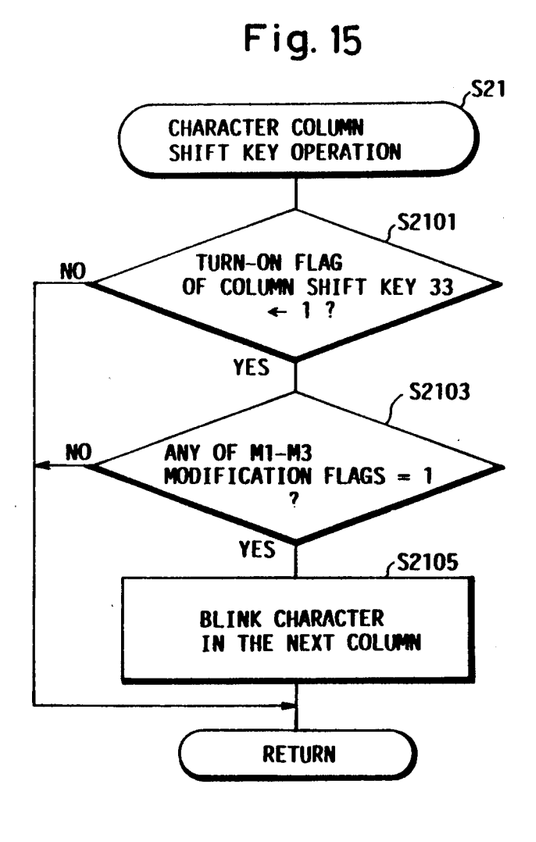
FIG. 15 is a flowchart of a character column shift key operation subroutine of the CPU 50.

11) Character column shift key operation : FIG. 15

Figure 17:
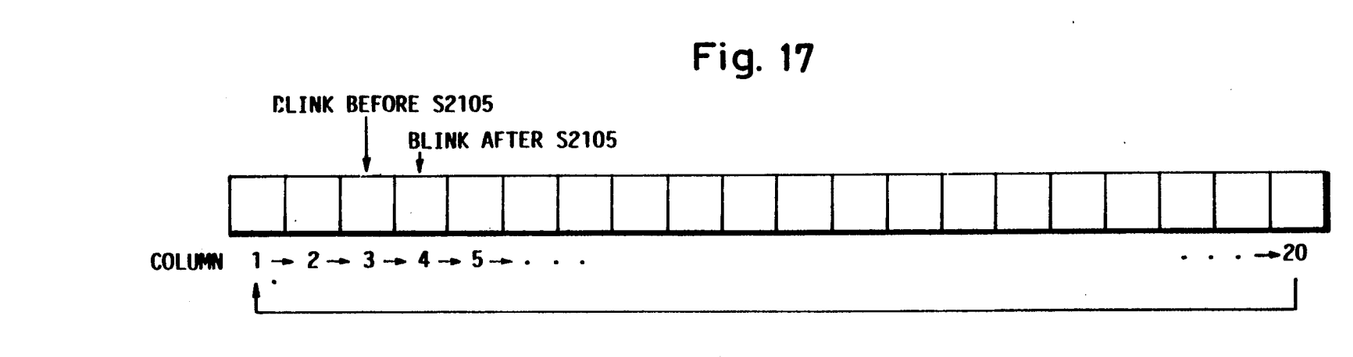

When the turn-on flag of the character column shift key 33 is set (S2101 ; YES) and any of the M1–M3 modification flags is being set (S2103 YES), character column shift is effected. For example, as shown in FIG. 17, if the character in the third column is blinking before step S2105, the character stops blinking and the character in the next column (fourth column) starts blinking in step S2105. In this way, the characters in the message to be modified are sequentially blinked column by column.

As described above, in the message data modification mode, the messages M1, M2 and M3 can be modified in accordance with the operator's skill and the working condition of the apparatus.

That is, where the operator is not so trained, "WAIT MAX. 30 SECONDS" may be displayed instead of "WAIT" as the message M1. Further, where another copier capable of continuously copying 100 two sided copies is provided adjacent to the copier, "ADJACENT COPIER ; TWO SIDED COPY MAX. 100" may be displayed instead of "TWO SIDED COPY MAX. 50", as the message M3. According to this construction, operation of the copier, supplement of toner or the like and trouble management can be done easily, whereby operability and efficiency of the copier are remarkably improved.

In the above embodiment, when the original messages are to be displayed, corresponding message data stored in the ROM 53 are transmitted to the RAM 51 and read out from the RAM 51 for display. However, the original message data may directly be read out of the ROM 53.

In the above embodiment, the message data to be modified is once transmitted to the RAM 52. However, the message data in the RAM 51 may directly be modified.

Further, instead of modifying the messages, a plurality of messages may be stored in the ROM 53 in accordance with the operator's skill or the like so that the operator can select a proper one from the above messages.

Modification of the messages can also be realized by modifying a pointer or a table specifying a memory area corresponding to the status of the copier. For example, a 16-bits address pointer specified by an 8-bits data corresponding to the status of the copier may be used to specify the memory area.

In addition, inputting means for inputting the message data and pointer information is not limited to the key switches on the operation panel, and an interface for receiving data from a memory medium such as an IC card or an interface for receiving data from a keyboard on line may be employed. In this case, since message data origination can be made using an edit function of a personal computer or the like, easier modification of the messages is realized.

Further, the present invention is not limited to the copier described in the above embodiment but may also be applied to other apparatuses such as a facsimile machine and a printer wherein messages are displayed.

The messages may be those for demanding supplement of apparatus materials such as "TONER EMPTY" and "PAPER EMPTY", those for indicating the status of the apparatus such as "WARM UP", "PRINTING", "DTMF SIGNAL TRANSMISSION" and "CALL SIGNAL RECEIVED" and those for notifying trouble such as "PAPER JAMMING", "POWER SOURCE MAL CONNECTION", "ABNORMAL TEMPERATURE RISE IN FIXING SECTION" and "MAL TRANSMISSION".

Further, the message to be displayed is not limited to characters and graphic pattern may be employed.

Although the present invention has been fully described by way of embodiment with references to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An information display device for displaying a message in accordance with the status of an apparatus or which said information display device is employed, said information display device comprising:
    changing means for changing a message to be displayed;
    inputting means for inputting instructions to change the message to be displayed;
    displaying means for displaying the changed message; and
    storing means for storing the message; and
    display control means for controlling said displaying means to display the message stored in said storing means in accordance with the status of the apparatus;
    wherein said changing means modifies the relationship between the status of the apparatus and the message stored in said storing means.

2. An information display device as claimed in claim 1, wherein the message comprises a character.

3. An information display device as claimed in claim 1, wherein the message comprises a graphic pattern.

4. An information display device as claimed in claim 1, wherein said changing means modifies the message store in said storing means.

5. An information display device as claimed in claim 1, further comprising;
pointer storing means for storing a pointer associating the status of the apparatus with the message stored in said storing means, said pointer being modified by said changing means.

6. An Information display device as claimed in claim 1, further comprising:
table storing means for storing a table associating the status of the apparatus with the message stored in said storing means,
wherein said storing means stores a plurality of messages in accordance with a predetermined status of the apparatus, wherein said display control means controls said displaying means to select any of the plurality of messages on the basis of the table and to display the selected message and wherein said changing means modifies the table, thereby changing which message of the plurality of messages is to be displayed.

7. In an image forming apparatus, a display device for displaying information regarding the status of said image forming apparatus, comprising:
storing means for storing an information regarding the status of said image forming apparatus;
displaying means for displaying the message stored in said storage means;
modifying means for modifying the message displayed by said displaying means; and
inputting means for inputting the modified message into said storing means.

8. A display device as claimed in claim 7, wherein said displaying means includes a display comprising a plurality of aligned character areas forming an information to be displayed and said modifying means modifies the information by changing a character in every single character area.

9. A display device as claimed in claim 7, wherein said storing means is a rewritable memory.

10. In an image forming apparatus, a display device for displaying information regarding the status of said image forming apparatus, comprising:
storing means for storing the written message in a predetermined area of a menu, said storing means having the menu;
displaying means for displaying the stored message;
control means for controlling said storing means and said displaying means so as to automatically call the message stored in a predetermined area in accordance with the status of said image forming apparatus and to display the called message in said displaying means;
modifying means for modifying the message displayed by said displaying means; and
inputting means for inputting the modified message into said storing means.

11. In an image forming apparatus, a display device for displaying information regarding the status of said image forming apparatus comprising:
storing means for storing a plurality of original messages regarding the status of said image forming apparatus;
selecting means for selecting a message out of the plurality of messages stored in said storing means;
displaying means for displaying the message selected by said selecting means;
modifying means for modifying the message displayed by said displaying means; and
inputting means for inputting the modified message into said storing means.

12. In an image forming apparatus, a display device for displaying information regarding the status of said image forming apparatus comprising:
outputting means for outputting a status signal corresponding to the status of said image forming apparatus;
storing means for storing a plurality of original messages regarding the status of said image forming apparatus;
displaying means for automatically displaying a desired message out of the plurality of original messages stored in said storing means in response to the status signal output by said outputting means;
sending means for sending one of the plurality of original messages from said storing means to said displaying means regardless cf the status signal;
modifying means for modifying the message displayed by said displaying means; and
inputting means for inputting the modified message into said storing means.

13. In an image forming apparatus, a display device for displaying information regarding the status of said image forming apparatus comprising:
outputting means for outputting a status signal corresponding to the status of said image forming apparatus;
first storing means for storing a plurality of original messages regarding the status of said image forming apparatus;
second storing means for storing the plurality of original messages transferred thereto from said first storing means;
displaying means for automatically displaying a predetermined message out of the plurality of messages stored in said second storing means in response to the status signal output by said outputting means;
sending means for sending one of the plurality of messages from said second storing means to said displaying means regardless of the status signal; and
modifying means for modifying the message displayed by said displaying means; and
inputting means for inputting the modified message into said second storing means.

14. A display device as claimed in claim 13, wherein said first storing means is a read-only memory.

15. A display device as claimed in claim 13, wherein said second storing means is a rewritable memory.

16. A display device as claimed in claim 13, further comprising:
original message restoring means for restoring the modified message stored in said second storing means to the original message stored in said first storing means in response to a predetermined operation.

17. An information display device for displaying information regarding an apparatus on which the information display device is employed, said information display device comprising:
- storing means for storing a plurality of original messages regarding the status of said image forming apparatus;
- control means for reading out the message data stored in said storing means in accordance with the status of the apparatus;
- displaying means for displaying the message read by said control means;
- modifying means for modifying the message displayed by said displaying means; and
- inputting means for inputting the modified message into said storing means.

18. An information display device as claimed in claim 17, wherein said inputting means is a key switch provided on an operation panel.

19. An information display device as claimed in claim 17, wherein said inputting means is an interface for receiving data from a recording medium.

20. An information display device as claimed in claim 17, wherein said inputting means is an interface for receiving data from a message modification data output apparatus on line.

* * * * *